US008997940B2

(12) United States Patent
Villa

(10) Patent No.: US 8,997,940 B2
(45) Date of Patent: Apr. 7, 2015

(54) ELEVATOR INSTALLATION AND OPERATION METHOD THEREFOR

(75) Inventor: Valerio Villa, Gironico (IT)

(73) Assignee: Inventio AG, Hergiswil (CH)

( * ) Notice: Subject to any disclaimer, the term of this patent is extended or adjusted under 35 U.S.C. 154(b) by 692 days.

(21) Appl. No.: 13/309,126

(22) Filed: Dec. 1, 2011

(65) Prior Publication Data
US 2012/0152655 A1 Jun. 21, 2012

(30) Foreign Application Priority Data

Dec. 15, 2010 (EP) .................................. 10195173

(51) Int. Cl.
B66B 1/16 (2006.01)
B66B 1/24 (2006.01)

(52) U.S. Cl.
CPC ............ B66B 1/2408 (2013.01); B66B 1/2433 (2013.01); Y02B 50/122 (2013.01)

(58) Field of Classification Search
CPC .................... B66B 2201/21; B66B 2201/211; B66B 2201/212; B66B 2201/216
USPC .......................... 187/247, 380–388, 391–393
See application file for complete search history.

(56) References Cited

U.S. PATENT DOCUMENTS

| | | | | |
|---|---|---|---|---|
| 5,932,852 A * | 8/1999 | Tyni et al. | ...................... | 187/382 |
| 6,293,368 B1 * | 9/2001 | Ylinen et al. | .................. | 187/382 |
| 6,672,431 B2 * | 1/2004 | Brand et al. | ................... | 187/382 |
| 6,857,506 B1 * | 2/2005 | Tyni et al. | ...................... | 187/282 |
| 6,935,467 B1 * | 8/2005 | Tyni et al. | ...................... | 187/382 |
| 7,032,715 B2 * | 4/2006 | Smith et al. | ................... | 187/380 |
| 7,275,623 B2 * | 10/2007 | Tyni et al. | ...................... | 187/382 |
| 7,416,057 B2 * | 8/2008 | Kostka | .......................... | 187/382 |
| 7,546,906 B2 * | 6/2009 | Tyni et al. | ...................... | 187/382 |
| 7,743,890 B2 * | 6/2010 | Nikovski et al. | .............. | 187/382 |

(Continued)

FOREIGN PATENT DOCUMENTS

| | | |
|---|---|---|
| EP | 1553038 A1 | 7/2005 |
| EP | 1876129 A1 | 1/2008 |

(Continued)

OTHER PUBLICATIONS

Jose' Alberto Roig et al., "Bewertung der Umweltverträglichkeit von Aufzügen im Laufe ihrer Nutzungsdauer", Lift Report—Ausgabe, Mar. 2010, pp. 1-10, Elevator Reports.

(Continued)

Primary Examiner — Anthony Salata
(74) Attorney, Agent, or Firm — Fraser Clemens Martin & Miller LLC; William J. Clemens

(57) ABSTRACT

An elevator installation includes a control unit and at least one elevator cage in a building with a plurality of stories, wherein elevator control units are arranged on at least two stories. A travel request is communicated to the control unit, wherein a destination story is defined either by the input into the elevator control unit or by an input into a control unit, which communicates the input to the control unit, and wherein the at least one input travel destination and the at least one input travel request are executed by the control unit by means of a collect operating mode. Energy consumption values of the elevator installation for journeys are determined by the control unit. A journey is undertaken to that destination story or travel request story for which the at least one energy consumption value of the elevator installation is smaller.

9 Claims, 4 Drawing Sheets

ABE: Elevator control unit
AK: Elevator cage
BE: Control unit
F: Story
G: Counterweight
M: Drive
S: Hoistway shaft

(56) References Cited

U.S. PATENT DOCUMENTS

| | | | |
|---|---|---|---|
| 7,909,143 B2 * | 3/2011 | Tyni et al. | 187/382 |
| 8,602,172 B2 * | 12/2013 | Suzuki et al. | 187/382 |
| 8,794,388 B2 * | 8/2014 | Takeda | 187/382 |

FOREIGN PATENT DOCUMENTS

| | | |
|---|---|---|
| WO | 2006120283 A1 | 11/2006 |
| WO | 2010086290 A1 | 8/2010 |

OTHER PUBLICATIONS

Jurg Nipkow, "Energieverbrauch and Einsparpotenziale bei Aufzügen", Energieverbrauch, Sep. 2006, pp. 49-53, Bulletin SEV/VSE, Swiss Agency for Energy-Efficiency S.A.F.E.

* cited by examiner

ABE: Elevator control unit
AK: Elevator cage
BE: Control unit
F: Story
G: Counterweight
M: Drive
S: Hoistway shaft F: Story
R: Travel request
t: time
Z: Destination story F: Story
R: Travel request
t: time
Z: Destination story F: Story
R: Travel request
t: time
Z: Destination story

ELEVATOR INSTALLATION AND OPERATION METHOD THEREFOR

CROSS-REFERENCE TO RELATED APPLICATION

This application claims priority to European Patent No. 10195173.9, filed Dec. 15, 2010, which is incorporated herein by reference.

FIELD

The disclosure relates to operating an elevator installation.

BACKGROUND

EP 1876129A1 describes a method for reducing the energy consumption of an elevator installation. In that case the elevator installation is alternatively brought into an operating mode or a standby mode. The highest energy consumption occurs in the operating mode, whilst the energy consumption in the standby mode is lower. A use criterion of the elevator installation, such as the presence of a passenger in an elevator cage, is detected by detecting means. In addition, standby criteria, such as periods of time with low traffic incidence, are also ascertained. As long as the standby criteria are not fulfilled, the elevator installation is left in the operating mode. As soon as the standby criteria are fulfilled and the use criterion is not fulfilled, the elevator installation is brought into the standby mode.

Possibilities for reducing energy consumption of elevator installations are discussed by José Alberto Roig, Ana Lorente, Agustin Chiminelli and José Núñez in the article "Bewertung der Umweltverträglichkeit von Aufzügen im Laufe ihrer Nutzungsdauer" in issue March 2010 of Elevator Reports. In that case there is description of, inter alia, methods for measuring or ascertaining the energy consumption or energy consumption values of elevator installations.

In the Abstract of the closing report "Energieverbrauch and Einsparpotenziale bei Aufzügen" of Jürg Nipkow of the Swiss Agency for Energy-Efficiency S.A.F.E., with the publication number 250057, the author describes the results of a research project concluded at the end of 2005. Various possibilities of energy savings with elevators are discussed.

WO 2010/086290 A1 describes a method for energy-saving operation of an elevator installation, wherein the energy consumption of at least one energy consumer of the elevator installation is detected, at least one traffic situation of the elevator installation is detected, at least one energy consumption value is ascertained for the detected energy consumption and the detected traffic situation and the ascertained energy consumption value is output on at least one output means.

Hitherto it was sought, for example, to reduce the energy consumption of an elevator installation by new or improved components of an elevator installation, which can lead to higher costs for the operator of an elevator installation. A further possibility for reducing the energy consumption of elevator installations consists in bringing the elevator installation in the case of non-use into a waiting mode (standby mode). This means that, for example, superfluous lighting, displays, control units or other elevator components are temporarily switched off. If a travel request occurs, the elevator installation awakes and executes the elevator journey, but without taking into consideration the energy consumption of the elevator journey. The waiting mode in the case of elevator installations can have the disadvantage that the time period between waiting mode and operating readiness of the elevator installation can be comparatively lengthy.

SUMMARY

In at least some embodiments there is a determination, by a control unit of an elevator installation in a building with a plurality of stories, of a respective energy consumption value of the elevator installation for the journey from a current stopping story of an elevator cage of the elevator installation to at least one respective input destination story and at least one respective input travel request story. In that case, a journey is undertaken by the elevator cage to that destination or travel request story for which the at least one energy consumption value of the elevator installation is minimal.

In further embodiments, the elevator cage is moved between the stories. A respective elevator control unit for input of a travel request is arranged on at least two stories. In some embodiments, an elevator control unit can also be arranged on each story.

In various embodiments of the method, the control unit receives a travel request from an elevator control unit arranged on the at least two stories. A destination story is defined either by the input into the elevator control unit or by an input into a control unit, which communicates the input to the control unit, in the elevator cage and the input is executed by the control unit. The control unit thus receives a statement with respect to a destination story. The at least one input travel request is executed by the control unit by means of a collect operating mode.

By collect operating mode there is understood in general that the elevator or the elevator cage during an elevator journey from a starting story to a destination story includes intermediate stops so that further passengers can board or disembark. This mode is in contrast to the so-termed taxi operation in elevator installations in which the elevator or the elevator cage is moved from the starting story to the destination story without an intermediate stop.

In some embodiments, the travel direction of the elevator cage is changed by the control unit in dependence on the ascertained energy consumption values. Thus, the elevator cage could, for example, be moved a story deeper before it continues its upward travel. The elevator cage is thus moved during a collect journey in the collect operating mode not upwardly only or downwardly only, but moved both downwardly and upwardly depending on ascertained energy consumption values. The travel pattern or travel plot in the collect operating mode thus has a zigzag course, i.e. the elevator cage thus does not travel continuously in upward direction or in downward direction.

The energy consumption values of the elevator installation can be determined or ascertained in dependence on, for example, the load in the elevator cage, the travel direction of the elevator cage, etc.

A sequence of the destination and travel request stories to which journeys are to be undertaken can be ascertained on the basis of the energy consumption values determined by the control unit. In that case, the sequence can be determined in such a manner that the total energy consumption of the elevator installation for the destination and travel request stories to which journeys are to be undertaken, thus the collect travel which is to be performed in the collect operating mode, is minimal. Moreover, it is also conceivable that the energy consumption values are ascertained by a central unit in a service center and passed on to the control unit of the elevator installation for further processing, for example for determination of the sequence of the stops, which are to be performed, with respect to the input destinations and the travel requests. A travel diagram for the collect journey to be undertaken is thereby defined and executed by the control unit. This travel diagram can, for example, be stored in a memory unit connected with the control unit. The sequence of the destination and travel request stories to which journeys are to be undertaken can, in at least some cases, change during performance of a collect journey. This can be the case when, for example, apart from the already registered destinations and travel requests a further travel request is input at an elevator control unit on a story.

In particular embodiments a story, to which a journey is to be undertaken, can be ascertained in dependence on—additionally to the energy consumption value—a rule. The most diverse parameters, conditions, procedures, intervals, etc., are conceivable as the rule. In some embodiments, several rules can be defined and, for example, combined together. A maximum time for an elevator journey from a starting story to a destination story of a passenger, the so-called service time, can, for example, be determined as the rule. However, the waiting time of a passenger at a starting or travel request story can also be determined. In addition, for example, the number of travel direction changes, the times when a travel direction change is not to be undertaken, the maximum load of the elevator cage, a maximum number of stories traveled to, the time of duty, a number of stories already traveled to, etc., can be used as the rule.

In some cases, the energy consumption of an elevator installation can be reduced merely by controlling or coordinating the elevator journeys to be executed.

In further embodiments, the method can be used even with existing elevator installations, since no constructional measures with respect to the components of an elevator installation have to be undertaken. Merely the control unit might have to be modified.

BRIEF DESCRIPTION OF THE DRAWINGS

The disclosure is explained in more detail on the basis of an exemplifying embodiment illustrated in the figures, in which.

DETAILED DESCRIPTION

Figure 1:
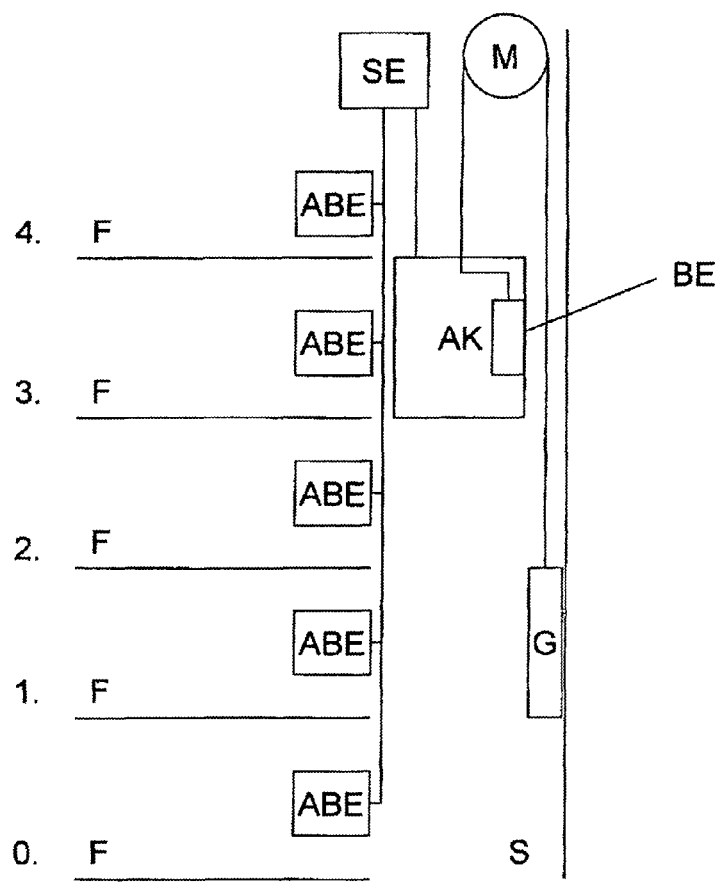
FIG. 1 shows an exemplifying elevator installation, which can be operated in accordance with embodiments of the disclosed method.

The following is a list of the symbols used in the Detailed Description and the drawings including the German words upon which the symbols are based:
ABE: Elevator control unit (Aufzugsbedieneinheit)
AK: Elevator cage (Aufzugskabine)
BE: Control unit (Bedieneinheit)
F: Story (Stockwerke)
G: Counterweight (Gegengewicht)
M: Drive (Antrieb)
R: Travel request (Fahrtanfrage)
S: Hoistway shaft (Schacht)
SE: Control unit (Steuergerat)
Z: Destination story (Zielstockwerk)
FIG. 1 shows an example of an elevator installation for performance of the embodiments of the method according to the description in FIGS. 3 and 4. In this example use is made of an elevator with a counterweight G. A hydraulic elevator, an elevator without a counterweight, etc., can also be used. An elevator cage AK with a counterweight G and a drive M is disposed in a shaft S in a building with a plurality of stories F, namely stories 0 to 4th. The elevator cage AK has a control unit BE for the input of a destination story Z. In this example each story F has an elevator control unit ABE, these units being connected in wired manner or non-wired manner with a control unit SE by way of a suitable communications network. The control unit BE in the elevator cage AK is also connected with the control unit SE by way of a communications network, be it by way of an own communications network or the same communications network as the elevator control unit ABE.

Figure 2:
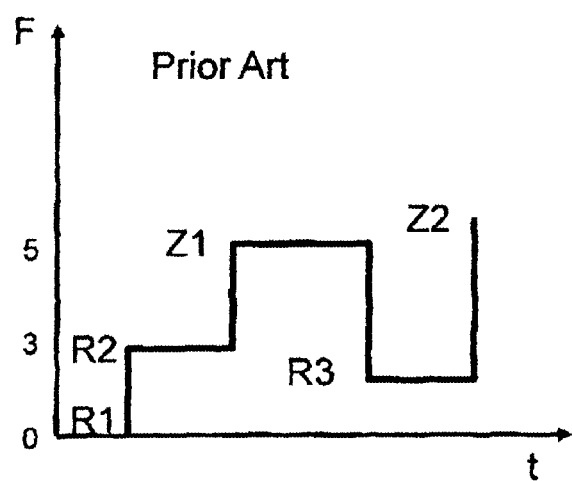
FIG. 2 shows an example of a known travel diagram.

FIG. 2 shows an example of a known travel diagram with a collect travel in a collect operating mode. The stories F to which journeys are undertaken are recorded as a function of time t in the travel diagram. The elevator journey or the collect journey in this example begins at the ground floor F, i.e. the 0 story, at the time t on the basis of a travel request R1 input at an elevator control unit ABE and passed on to a control unit SE and is to end at the 5th story, i.e. the destination story Z1. Due to a further travel request R2 at the 3rd story the control unit SE causes an intermediate stop of the elevator cage AK at this travel request story F. The request made at the 3rd story similarly ends at the 5th story. Yet a further travel request R3 from an elevator control unit ABE disposed on the 2nd story is registered. Since this travel request story, i.e. 2nd story, is located below the current stopping story, this travel request R3 is initially disregarded by the control unit SE and a journey to the destination story Z1 of the two other travel requests R1, R2, i.e. to the 5th story, is undertaken by the elevator cage AK. Having arrived there, the passengers disembark from the elevator cage AK.

The travel request R3 until now disregarded by the control unit SE is now processed. For this purpose the elevator cage AK travels in empty state to the travel request story, i.e. the 2nd story, so that it can bring the passengers requiring the journey to the 6th story, i.e. to the destination story Z2 of this travel request R3.

It is to be noted that the input of a destination story Z can take place either by way of the elevator control unit ABE or by way of a control unit BE in the elevator cage AK.

The travel request R1, R2, R3 input into the elevator control unit ABE and the input destination story Z1, Z2, wherein this input of the destination story Z1, Z2 is carried out either in the elevator control unit ABE or in a control unit BE in an elevator cage AK, are communicated to the control unit SE of the elevator installation so that the control unit SE can process and execute the request and the input of the destination story.

Figure 3:
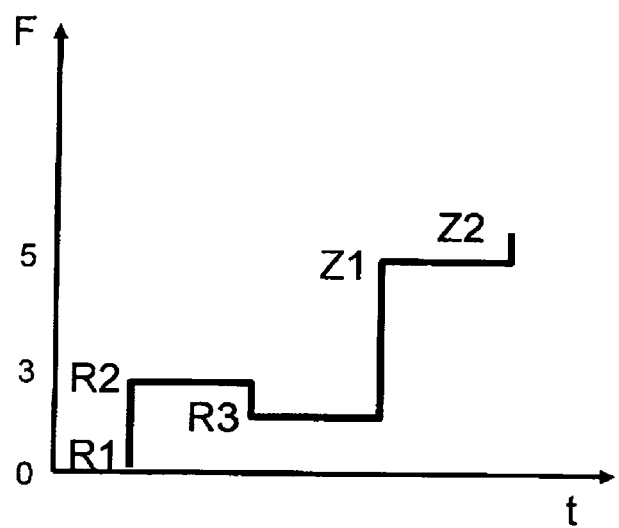
FIG. 3 shows an example of a travel diagram according to embodiments of the method described here.

FIG. 3 shows an example of a travel diagram. The collect journey again starts at the time t at the ground floor, i.e. the 0 story, with a travel request R1 which was input into an elevator control unit ABE and communicated to the control unit SE. The elevator cage AK again makes an intermediate stop at the 3rd story due to a further travel request R2. Yet a further travel request R3, which is input in an elevator control unit ABE at the 2nd story, is again registered by the control unit SE.

This time, however, the control unit SE now determines at least one respective energy consumption value of the elevator installation for the journey from the current stopping story, for example the 3rd story, of the elevator cage AK to the respective travel request story R3, in this example the 2nd story, and to the respective destination stories Z1, Z2, in this example the 5th and 6th stories.

A journey is now undertaken to that destination or travel request story Z1, Z2, R3 for which the at least one energy consumption value of the elevator installation is minimal. In this example the energy consumption value of the elevator installation for a journey to the 2nd story is minimal. A travel direction change thus takes place before the collect journey in upward direction to the destination stories Z1, Z2, i.e. to the 5th and 6th stories, is continued. Through the execution of the travel request R3 on the 2nd story and the change in travel direction, which is connected therewith, the energy consumption of the elevator installation can be minimized in simple and efficient manner.

The energy consumption values can in that case be determined in dependence on the load in the elevator cage AK, the travel direction of the elevator cage AK, etc. Use can be made, as load, not only of the current load existing in the elevator cage AK, but also the estimated additional load due to the boarding of passengers at a travel request story R1, R2, R3.

Determination of the energy consumption values can be carried out by different methods, such as, for example, described in the Elevator Report Article "Bewertung der Umweltverträglichkeit von Aufzügen im Laufe ihrer Nutzungsdauer" March 2010. Thus, for example, the energy consumption for a representative journey can be determined. In that case individual energy consumption values such as, for example, for an upward journey to the highest stopping point, a downward journey to the lower stopping point and the respective door operation (opening and closing), can be calculated. The energy consumption of other journeys can then be determined on the basis of the individual energy consumption values. With inclusion of a traffic pattern of the elevator installation the overall energy of an elevator installation can be determined. In addition, the energy consumption of an elevator installation can be determined on the basis of consumption measurements for every possible journey or on the basis of simplified energy models.

It is conceivable that a sequence of the destination and travel request stories Z1, Z2, R1, R2, R3 to which journeys are to be made is determined by the control unit SE on the basis of the ascertained energy consumption values. In that case the sequence of the destination and travel request stories Z1, Z2, R1, R2, R3 to which journeys are to be undertaken can be determined in such a manner that the total energy consumption of the elevator installation is minimal or reduced. The sequence can be stored in the form of a list, table, etc., in a memory unit, which is not shown in the figures. The memory unit is in that case connected with the control unit SE and then either integrated in the control unit or separate therefrom (SE). The determined sequence can either be determined statically on an occasion prior to the collect journey and correspondingly executed by the control unit SE or it can be dynamically changed during operation of the elevator installation.

It is also conceivable that a central unit, for example in a service center, determines the energy consumption values of the elevator installation and communicates them to the control unit SE for further processing or for execution.

In addition to the energy consumption values the destination and/or travel request stories Z1, Z2, R1, R2, R3 to which journeys are to be undertaken can be determined by the control unit SE in dependence on a rule. In principle, all parameters, conditions, intervals, etc., which can ensure efficient elevator operation can be used as the rule. Thus, for example, a value or an interval for a service time can be determined. By service time there is meant the time for execution of a requested elevator journey from the travel request story R1, R2, R3 to the destination story Z1, Z2. This in general increases when journeys are to be made by the elevator cage AK to additional travel request stories. In addition, the minimum and/or maximum waiting time of a passenger on a travel request story could be defined in accordance with a rule. The number of maximum travel direction changes, conditions when no change in travel direction is undertaken, etc., could, for example, be indicated as rules with respect to the travel direction change. Thus, times of day, for example the main traffic times in a building, in which no travel direction change by the elevator installation is to be undertaken could be indicated as a condition. A further condition could, for example, regulate priority journeys. In addition, minimum and/or maximum load values in the elevator cage AK could be used as the rule. Thus, for example, the load in the elevator cage AK could be regulated in such a manner that the energy consumption of the elevator installation due to load management can be reduced. A further example for a rule can be that the minimum and/or maximum number of destination and/or travel request stories Z1, Z2, R1, R2, R3 to which journeys are to be undertaken within a collect journey is determined.

Figure 4:
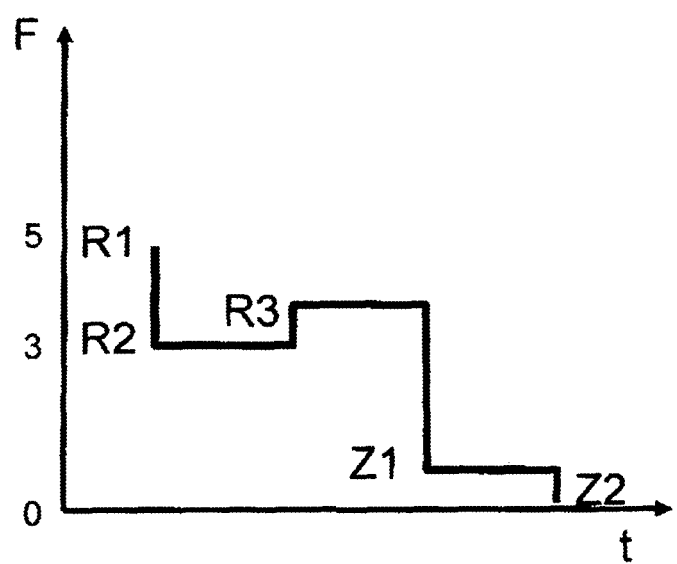
FIG. 4 shows a further example of a travel diagram according to embodiments of the method described here.

FIG. 4 shows a further example of a travel diagram. In this example the elevator cage AK changes the travel direction from the 3rd story to the 4th story due to more favorable or minimal energy consumption values so that it (AK) can execute a travel request R3. The passengers are thereafter brought in the elevator cage AK to their destination stories Z1, Z2 at the 1st story and ground floor. The method is otherwise used as is described in FIG. 3.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. An elevator installation operation method in a collect operating mode, comprising:
   determining, using a control unit, a first energy consumption value of an elevator installation for a first journey from a current stopping story of an elevator cage of the installation to at least one input destination story;
   determining, using the control unit, a second energy consumption value of the elevator installation for a second journey from the current stopping story to at least one input travel request story requiring a change in a travel direction of the elevator cage;
   determining a smallest energy consumption value out of the first energy consumption value and the second energy consumption value;
   performing, using the elevator cage, a one of the first journey and the second journey based on the determined smallest energy consumption value.

2. The elevator installation operation method of claim 1, the first and second energy consumption values being determined based on a load in the elevator cage.

3. The elevator installation operation method of claim 1, the first and second energy consumption values being determined based on a travel direction of the elevator cage.

4. The elevator installation operation method of claim 1, further comprising determining, based on the first and second energy consumption values, a sequence of destination stories and travel request stories for the elevator cage.

5. The elevator installation operation method of claim 4, the determined sequence of destination stories and travel request stories for the elevator cage requiring a minimal energy consumption by the elevator installation.

6. The elevator installation operation method of claim 1, the journey performed by the elevator cage being further based on a rule.

7. The elevator installation operation method of claim 6, the rule comprising one or more of a service time, a waiting time, a travel direction change, a load value for the elevator cage, a number of destination stories to which journeys have already been undertaken, a number of travel request stories to which journeys have already been undertaken, and a time of day.

8. The elevator installation operation method of claim 7, the rule comprising a waiting time.

9. An elevator installation comprising:
a control unit;
at least one elevator cage in a building, the building comprising a plurality of stories, the at least one elevator cage being movable among the plurality of stories; and
respective elevator control units arranged on the plurality of stories, the respective elevator control units being configured to receive a travel request and transmit the travel request to the control unit, the control unit being configured in a collect mode to,
determine a first energy consumption value of the elevator installation for a first journey from a current stopping story of the at least one elevator cage to at least one input destination story indicated by the travel request,
determine a second energy consumption value of the elevator installation for a second journey from the current stopping story to at least one input travel request story indicated by the travel request and requiring a change in a travel direction of the elevator cage,
determine a smallest energy consumption value out of the first energy consumption value and the second energy consumption value, and
perform, using the elevator cage, a one of the first journey and the second journey based on the determined smallest energy consumption value.

* * * * *